United States Patent Office 3,168,943
Patented Feb. 9, 1965

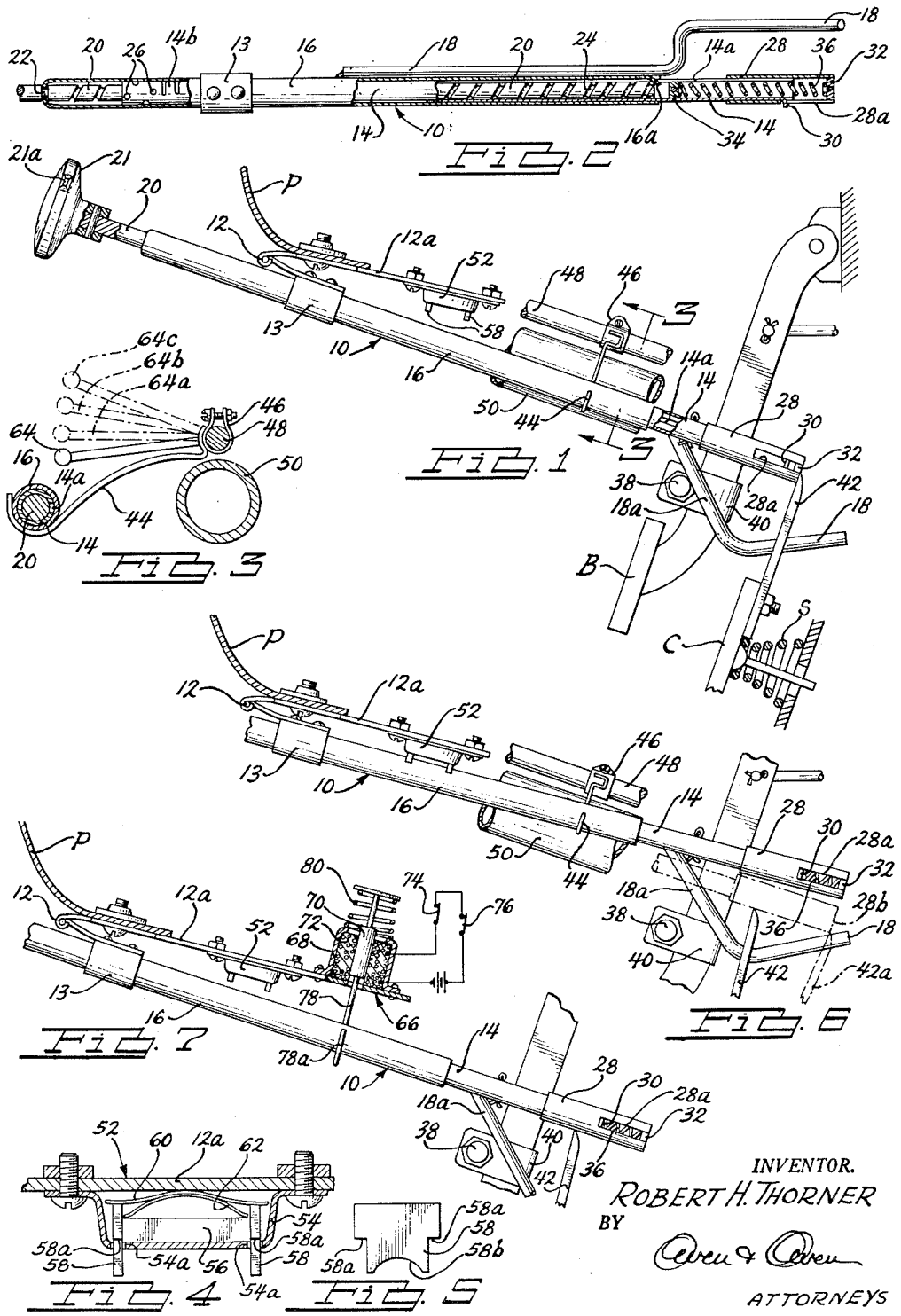

3,168,943
THROTTLE CONTROL MECHANISM PROVIDING AUTOMATIC ENGAGEMENT AND SAFETY LOCKOUT
Robert H. Thorner, 8750 W. Chicago Blvd., Detroit, Mich.
Continuation of application Ser. No. 859,504, Dec. 14, 1959. This application Sept. 27, 1963, Ser. No. 312,143
34 Claims. (Cl. 192—3)

This application is a continuation of S.N. 859,504, now abandoned, filed December 14, 1959, entitled "Throttle Control Mechanism" and a continuation-in-part of my copending applications, Serial No. 453,745, filed September 2, 1954, entitled "Throttle Control Device," now Patent No. 2,917,142, and Serial No. 836,419, filed August 27, 1959, entitled "Throttle Control Mechanism."

This invention relates to an improvement in a control device to position the control means or throttle of an automotive vehicle whereby the driver may rest his foot and leg during sustained driving periods. In one form, the invention may be associated directly with the accelerator pedal, preferably in a location which permits cooperation with the brake-actuating mechanism.

An object of the present invention is to provide a throttle control device for an automotive vehicle which is simple in construction, and which, for safety purposes, is inactivated solely by positive mechanical means to completely disconnect the device from the normal vehicle controls, and which may include means to automatically lock-out the device to render it inoperative whenever the vehicle is not in operation.

Another object of the present invention is to provide a throttle control device for an automotive vehicle as described in the preceding paragraph including in the combination novel permanent magnet means arranged to maintain the device in the inoperative or "off" position.

An additional object of the present invention is to provide a throttle control device for an automotive vehicle as described in the preceding paragraph, in which re-engagement of the device, after braking the car, is entirely automatic and incident to depression of the accelerator pedal.

Other objects and advantages of the invention will become apparent from the following description and from the accompanying drawings, in which:

FIG. 1 is an elevational view of one form of the invention as seen from the driver's right side, the device being shown in its active or engaged position, and vehicle parts being diagrammatically indicated in section;

FIG. 2 is a top plan view of a tubular portion of the device shown in FIG. 1 with parts broken away and parts in section;

FIG. 3 is a fragmentary sectional view taken along the line 3—3 of FIG. 1, showing means controlled by the transmission selector member for automatically rendering inoperative the device of the present invention;

FIGS. 4 and 5 are entitled side and end views showing the magnet means illustrated in FIG. 1;

FIG. 6 is an elevational view of the device of the present invention in its "off" or lock-out position (inoperative); and FIG. 7 is an elevational view of the device of the present invention in its inactive or "coasting" position.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Referring to the drawings, the present invention is shown, by way of illustration, as applied to an automotive vehicle to control the throttle and hence the flow of gas mixture to the engine for establishing the speed thereof. The conventional brake pedal B and accelerator pedal C are shown in their operative relation. The accelerator is urged in an idle direction by the usual spring S. The term "throttle" as used herein is intended to include the speed controlling member of any kind of engine. The term "engine control means" as used herein is intended to include the throttle plus any operating linkage connected thereto. Also the term "engine control means" may be interpreted to cover any equivalent means for setting the speed of any engine such as a diesel or gas turbine engine for example.

In FIGS. 1 and 2, a tube assembly 10 for holding the control means is pivoted for angular movements about hinge means secured thereto, such as a door-type pin-hinge 12, also secured to the vehicle dash panel P, as by a pair of screws shown. The tube assembly comprises an inside detent tube 14 telescoping within an outer tube 16 and axially slidable in relation thereto. A cam-piece 18, illustrated in the form of a metal rod, is secured to the outer tube, as by silver soldering. A rod or a shaft 20 having a knob 21 secured at one end, as by pinning, is inserted within the bore of the inside tube for free relative rotational movements. As shown in FIG. 2 one end of the outer tube is rolled into a peripheral groove 22 of shaft 20 to prevent relative axial movements but enable complete relative rotary movements. The inside tube 14 has an axial slot 14a formed in its entire length (FIGS. 1, 2 and 3) to receive a tab 16a of tube 16 bent into the slot, as shown in FIG. 2. A pair of tabs 14b are sprung outwardly to provide friction as desired. Shaft 20 also includes a thread 24 cooperating with depressions or dimples 26 in the inside tube so that rotation of knob 21 causes the inside tube 14 to extend from or telescope into the outside tube 16, for positioning the control means. Thus manually adjustable means are provided to control speed, and in the form shown includes knob 21, 21a, shaft 20, thread means 24, 26, tube 14, slot 14a, tab 16a, etc.

Means are provided to enable lost-motion connection of the throttle-holder with the control means. In the forms shown, such means include a tube extension 28 carried by tube 14 and having a slot 28a cooperating with a stop tab 30 bent out from tube 14 to enable free but limited axial movements of extension 28 in relation to tube 14. A plug 32 is secured by suitable means, as by soldering or pinning, to the end of extension 28 and another plug 34 is secured within tube 14, as by a cotter pin; and a spring 36 is inserted between the two plugs to urge extension 28 into its rightwardly position, as shown in FIG. 2, wherein the left end of the slot 28a abuts rightwardly against tab 30.

A brake release pin 38 is secured, as by nuts, to the brake arm by a bracket 40. The pin 38 extends any desired length in a direction perpendicular to the plane of the drawings. A cam portion 18a of cam-piece 18 rests by gravity on brake release pin 38 since the section of tube assembly 10 to the right of hinge 12 is heavier than the section to the left thereof. The accelerator C has secured thereto an extension 42 in alignment with tube extension 28 to cooperate therewith in a manner to be described. Thus in the forms shown, the means necessary to position the control means includes the shaft 20, tubes 16 and 14 (with its extension 28) and the accelerator extension 42, or the accelerator itself if long enough to be the equivalent of extension 42.

The throttle control device operates as follows: In FIG. 1, the throttle holder is shown in its active or engaged position to hold the accelerator extension 42 in any desired position selected by rotation of knob 21. A single tactile indicator 21a on knob 21 is "felt" by the operator to tell (by touch) its rotary position corresponding to 3, 6, 9 or 12 o'clock, for example, and the speed is noted at each "clock" position. Thereafter, the indicator is set (by feel) to a memorized clock position corresponding to the desired speed. In the position shown in FIG. 1, the force of spring 36 is always overpowered by the accelerator return spring S so that plug 32 abuts the end of tube 14. When the brake pedal is either depressed slightly to reduce speed merely by "coasting" or is depressed fully to stop the vehicle, pin 38 acts on cam-portion 18a to raise the tube assembly 10 completely clear of extension 42. At this time, the tube extension 28 snaps to its extreme rightward position while the accelerator snaps in a reduce-speed direction to its idle position. An audible "clicking" sound is produced when the tube extension snaps to the right, which signals the driver that the throttle-holder is released to its inactive (but not inoperative) position. When the foot is again removed from the brake pedal, the tube extension rests by gravity on top of the accelerator extension as shown in FIG. 7, which is the inactive or "coasting" position (also shown in FIG. 6 as 28b). The vehicle can now be driven normally since the end of accelerator extension 42 will merely ride along the bottom of tube extension 28 without engagement since the latter now extends beyond the accelerator positions for average driving at a given speed setting of the knob. The throttle-holder (sometimes known as a "hand throttle") is re-engaged automatically at any time merely by depressing the accelerator in its increase-speed direction to such an extent that the pedal extension 42 moves past the end of extension 28 (as at 42a in FIG. 6); at this time the lost-motion action is effected when the tube assembly 10 drops down until the cam-portion 18a strikes pin 38 which makes an audible clicking signal to indicate that the foot can be removed from the accelerator, and the device is again in the position shown in FIG. 1 when the force of the accelerator spring S overpowers spring 36. Thus, the purpose of the lost-motion means is to require engagement at a predetermined distance at a second position beyond the manually set position to prevent unwanted engagement in normal driving. The accelerator must be depressed slightly (such as one-half inch) beyond the set position to engage the control device.

Restraining means are provided to enable manual or automatic lock-out of the throttle holder to its inoperative or "off" position and to maintain the device in this inoperative position while the vehicle is inactivated. Such restraining means may be manually operated, or automatically operated by an element of the vehicle which is movable selectively by the vehicle-driver incident to normal operation of the vehicle. In FIGS. 1, 3 and 6, such restraining means comprises a wire 44 secured to a bracket 46, as by soldering, which is clamped to a manually movable element of the vehicle such as the transmission control shaft 48 mounted above the steering post 50. In a preferred form of the invention to be discussed, the main supporting hinge 12 includes an extension 12a made of non-magnetic material such as brass for purposes described hereinafter.

Manually releasable safety means may be provided, as part of the restraining means or separate therefrom, to maintain the throttle holder in its inoperative position or status after the vehicle is again activated; its purpose is to require the driver to consciously or deliberately activate the device manually each time the vehicle is first operated. In the forms shown such manually releasable safety means includes a permanent magnet latch assembly 52 which is secured to extension 12a, as by brass screws and nuts, and provides the action of a magnetic latch. Referring to FIGS. 4 and 5 the magnet assembly illustrated herein comprises a housing 54 made of non-magnetic material, such as brass, aluminum, or plastic. The housing contains a permanent magnet 56 having at its ground ends a pair of floating poles 58 made of soft iron, for example. The poles project through openings 54a in housing 54 to abut the shoulders 58a of each pole. The openings 54a are large enough to permit lateral displacement of the poles, and housing 54 is deep enough to permit slight vertical displacement thereof (such as 1/32 inch). A free-floating leaf spring 60 of phosphorous bronze, for example, bears downwardly on the poles 58 tending to move same into their abutting positions, and is provided to prevent rattling. A similar free-floating spring 62 bears downwardly on the magnet for the same purpose. The poles include a semi-circular portion 58b (FIG. 5) having the same diameter as the outer tube 16 to conform thereto.

For operation of the restraining and safety means, the wire 44 may be pre-bent upwardly to provide a slight predetermined upward force on the tube assembly 10 which is exceeded by the weight thereof in the "drive" position of the transmission. A transmission control lever 64 is shown in "drive" position of a conventional automatic transmission (FIG. 3) which would correspond to first and third gear angular positions of the control lever for a standard step-shift manual transmission. With the lever in this "drive" position, the wire just touches the lower side of tube 16 so that the control device can be engaged in a normal manner as above described. When the control lever is moved to neutral, reverse or "park" (in automatic transmissions) shown in dotted positions 64a, 64b and 64c, respectively, the safety wire holds the tube assembly clear of the accelerator extension 42, and the tube 16 contacts magnet poles 58 to be held thereby. The poles are made to "float" as above described to accommodate any production variations of the parts. Thus the safety means is initiated or operated as a result of operation of the restraining means. When the lever 64 is returned to "drive" (or third gear) position, the tube assembly is still held in its inoperative or "off" position by the magnet. The tube assembly must be moved consciously by the vehicle-operator into its inactive or "coasting" position (FIG. 7) by pressing upwardly on the bottom of knob 21 to overpower the force of the magnet assembly 52, and the control device is thereafter operated as above described. In this action, the knob 21 comprises manually operated or controlled means which are operatively associated with (or are a part of) the safety means including the magnet latch assembly 52.

A second form of restraining means is illustrated in FIG. 7 in which a solenoid 66 is supported by a bracket 68 fastened to the hinge extension 12a. The solenoid includes an armature 70 sliding axially within a coil 72 connected in series with the ignition switch 74 and/or a switch 76 controlled by transmission shaft 48, preferably to close only in "drive" position. The armature carries a wire-piece or rod 78 having a U-portion 78a at its lower end for engaging the tube assembly 10. A spring 80 urges the tube assembly into its inoperative position whenever switch 74 and/or switch 76 is open, such as when the engine is shut off and/or the transmission control is not in "drive" position. When the engine is started and/or the control lever 64 is moved into "drive" position, the solenoid is energized and armature 70 moves wire 78 down and clear of the tube assembly, as shown in FIG. 7. The driver then must consciously press upwardly on knob 21 to drop the tube assembly into its inactive or "coasting" position shown in FIG. 7 so he can operate the throttle-holder as above described.

If desired, the vacuum device shown in my co-pending application, Serial No. 836,419 may be used to restrain the tube assembly in cooperation with the novel magnetic holding means disclosed herein. Also, it is important to appreciate that speed-control device can be moved to its magnetically held inoperative or "off" position at any time whenever desired by the vehicle-driver merely by pressing downwardly on top of knob 21 until tube 16 enters the effective field of the magnet 56 and is held by poles 58.

The main purpose of the restraining means and safety means is to enable the use of the automatic engagement means by preventing a dangerous surprise factor whenever there is a change of drivers, or even if the same driver leaves the vehicle for extended periods and might forget that the device is ready to be engaged. For example, without the restraining means and safety means, but with automatic engagement means provided, if another driver enters the vehicle while the engine is idling, he might be surprised not knowing that the device is engaged, or worse, not even be aware that such a device exists or is on the vehicle. The restraining means disclosed herein automatically causes the speed control device to be rendered inoperative incident to normal selective operation of an element of the vehicle by the driver, which selective operation normally occurs whenever there is a change in drivers (while the vehicle would be at rest) so that the desired result is accomplished.

In the examples disclosed herein, the restraining means includes or is operated by the transmission elements 44, 64, or solenoid 66 controlled by switches 74, 76, when a vehicle element such as the transmission control lever normally is moved out of "drive" or "high gear" whenever there is a change of drivers. This "vehicle-element" is recited in some of the claims as *an element movable selectively by the vehicle-driver incident to normal operation of the vehicle at least after it has been brought to a stop after having been driven.* This expression, when used in the claims, is intended to cover the potentially dangerous condition when there is a driver-change with the speed-control device set for automatic engagement, occurring of course after the vehicle is brought to rest. The control device is rendered inoperative incident to operation by the vehicle-driver of an element which is a part of the vehicle, and is operable at his selection normally or usually when the vehicle is immobile, and accompanies a change in drivers or when one driver leaves the vehicle for a while and returns later thereto.

The "vehicle-element," illustrated herein is "selective" by the driver in the sense that in normal operation of the vehicle, it is the driver's choice or selection to move the transmission control lever out of "drive" into "neutral" position, for example; and the speed-control device is *automatically* rendered inoperative incident to and as a result of this selective movement of this vehicle-element, which selective movement normally accompanies a change in drivers as desired. In the foregoing concept, the phrase "in normal operation of the vehicle" is intended to cover any normal driver operation required between the times when the vehicle stands alone without a driver both before and after it is driven; and any element necessary to be operated by the driver "selectively" to perform such driver-operation between these times may be utilized if it qualifies broadly as above described.

I wish it understood that my invention is not limited to any specific construction, arrangement or form of the parts, as it is capable of numerous modifications and changes without departing from the spirit of the claims.

I claim:

1. An accelerator positioning device for an automotive vehicle having an engine, and said vehicle including an element manually movable by the vehicle-driver said vehicle having brake actuating means and having engine control means for setting the speed of the vehicle, said control means including accelerator pedal means, and biasing means to urge said accelerator pedal means toward its idle-speed position, comprising in combination; a movable mechanism operatively connected to a supporting portion of said vehicle and including release means, said mechanism also including detent means automatically movable into abutting position with respect to said accelerator pedal means after advancement thereof to hold said control means in a fixed position reacting against said supporting portion as a result of said biasing means during operation of said control device, said detent means being disposed in relation to said accelerator pedal means during operation of said control device to prevent movements of said pedal means in a reduce-speed direction from its abutting position, but to permit completely unrestricted normal manual movements thereof in either direction at any position on the high-speed side of said abutting position, said mechanism including manually operated means to adjust the distance between said pedal means and said supporting portion for setting said pedal means in any desired fixed position, said brake-actuating means including means disposed to cooperate with said release means to move said movable mechanism including said detent means in a direction transverse to the direction of movement of said pedal means to an inactive position completely clear of the path of travel of said pedal means upon movements of said brake actuating means, whereby said pedal means can return to its idle position without any possible interference from said mechanism, restraining means operatively connected to said movable mechanism and operable as a result of said manual movement of said element to automatically cause relative movement of said detent means with respect to said accelerator pedal means in said transverse direction to an inoperative position completely clear of said path of travel of said accelerator pedal means, and manually releasable safety means operatively associated with said restraining means to maintain said mechanism in said inoperative status after said vehicle is again being driven until said safety means is consciously and deliberately released by the vehicle-driver.

2. An accelerator positioning device for an automotive vehicle having an engine, and said vehicle including an element manually movable by the vehicle-operator said vehicle having normal brake actuating means and having engine control means for setting the speed of the vehicle, said controll means including accelerator pedal means, and biasing means to urge said accelerator pedal means toward its idle-speed position, comprising in combination; a movable mechanism including release means and including hinge means operatively connected to a supporting portion of said vehicle, said mechanism also including detent means operatively connected to said hinge means for angular automatic movements in a vertical direction into abutting position with respect to said accelerator pedal means after advancement thereof to hold said control means in a fixed position reacting at said supporting portion as a result of said biasing means during operation of said control device, said detent means being disposed in relation to said accelerator pedal means during normal operation of said control device to prevent movements of said pedal means in a reduce-speed direction from its abutting position, but to permit completely unrestricted normal manual movements thereof in either direction at any position on the high-speed side of said abutting position, said mechanism including manually operated means for setting said pedal means in any desired fixed position, said brake-actuating means including means disposed to cooperate with said release means to move said movable mechanism including said detent means in said vertical direction transverse to the direction of movement of said pedal means to an inactive position completely clear of the path of travel of said pedal means upon movements of said brake actuating means, whereby said pedal means can return to its idle position without any possible interference from said mechanism, restraining means operatively connected to said movable mechanism and operable as a result of said manual movement of said element to automatically cause relative movement of said detent means with respect to said accelerator pedal means in said vertical direction to an inoperative position completely clear of said path of travel of said accelerator pedal means, and manually releasable safety means operatively associated with said restraining means to maintain said mechanism in said inoperative status after said vehicle is again being driven until said safety means is consciously and deliberately released by the vehicle-driver.

3. In a control device for an automotive vehicle having an engine, said vehicle having brake-actuating means and having engine control means, and spring means to urge said control means toward its idle-speed position, the combination of means to hold said control means in any desired predetermined first position comprising, movable means operatively connected to a portion of said vehicle and including positioning means to establish said control means in said first named position, release means operatively associated with said brake-actuating means to effect inactivation of said positioning means with respect to said control means after a predetermined movement of said brake actuating means, said release means including means to cause said inactivation of said positioning means irrespective of a failure of any source of power in any part of the vehicle whenever the device is in operation to position said control means, said movable means including lost-motion means to effect automatic operative engagement of said positioning means and said control means after movement of said control means in its increase-speed direction to a second predetermined position always a fixed distance beyond said first position under all operating conditions of the device, and said lost-motion means being disposed to enable said spring means to move said operatively engaged lost-motion means and said control means in its idle-speed direction to said first predetermined position for holding said control means in said first position.

4. In a control device for an automotive vehicle having an engine, said vehicle having brake-actuating means and having engine control means, and spring means to urge said control means toward its idle-speed position, the combination of means to hold said control means in any desired predetermined first position comprising, movable means operatively connected to a portion of said vehicle and including positioning means to establish said control means in said first position, release means operatively associated with said brake-actuating means to effect inactivation of said positioning means with respect to said control means after a predetermined movement of said brake actuating means, said release means including means to cause said inactivation of said positioning means irrespective of a failure of any source of power in any part of the vehicle whenever the device is in operation to position said control means, said movable means including lost-motion means to effect automatic operative engagement of said positioning means and said control means after movement of said control means in its increase-speed direction to a second predetermined position beyond said first position on the high-speed side thereof, said lost-motion means including means to enable said spring means to move said operatively engaged lost-motion means and said control means in its idle-speed direction to said first predetermined position for holding said control means in said first position, and restraining means operatively connected to said positioning means to automatically effect relative movement thereof with respect to said control means to an inoperative position completely clear of the path of travel of said control means.

5. The combination of means defined in claim 30, and in which said restraining means includes electromagnetic means operable as a result of said movements of said element to render said positioning means inoperative with respect to said control means.

6. In a control device for an automotive vehicle having an engine, said vehicle having brake-actuating means and having engine control means, and spring means to urge said control means toward its idle-speed position, the combination of means to hold said control means in any desired predetermined first position comprising, movable means operatively connected to a portion of said vehicle and including positioning means to establish said control means in said first position, release means operatively associated with said brake actuating means to effectively inactivate said positioning means with respect to said control means after a predetermined movement of said brake-actuating means, said release means including means to cause said inactivation of said positioning means irrespective of a failure of any source of power in any part of the vehicle whenever the device is in operation to position said control means, said movable means including lost-motion means to effect operative engagement of said positioning means and said control means after movement of said control means in its increase-speed direction to a second predetermined position beyond said first position on the high-speed side thereof, said lost-motion means being disposed to enable said spring means to move said operatively engaged positioning means and said control means in its idle-speed direction to said first predetermined position for holding said control means in said first position, restraining means operatively associated with said positioning means to render same inoperative with respect to said control means, and permanent magnet means to maintain said positioning means in said inoperative status until deliberately released manually therefrom by the vehicle-driver.

7. In a control device for an automotive vehicle having an engine, said vehicle having brake-actuating means and having engine control means, and biasing means to urge said control means toward its idle-speed position, the combination comprising, movable means operatively connected to a portion of said vehicle and including positioning means to establish the operating position of said control means for controlling vehicle speed independent of foot pressure on the control means by the vehicle-driver, release means operatively associated with said brake-actuating means to cause inactivation of said positioning means with respect to said control means after a predetermined movement of said brake-actuating means, restraining means operatively associated with said positioning means to render same inoperative with respect to said control means, permanent magnet safety means operatively associated with said restraining means too maintain said positioning means in said inoperative status after said vehicle is activated until deliberately released from said inoperative status by the vehicle-driver, manually controlled means operatively associated with said magnet safety means to enable the vehicle-driver in a first operational step to consciously release said positioning means from its said inoperative status without operatively engaging said control means, said movable means including means in a second operational step to effect automatic operative engagement of said positioning means and said control means after movement of said control means in its increase-speed direction.

8. The combination of means defined in claim 7 and said vehicle including an element movable selectively by the vehicle-driver incident to normal operation of the vehicle at least after it has been brought to a stop after having been driven, and in which said restraining means comprises electro-magnetic means operable as a result of said movements of said element to render said positioning means inoperative.

9. The combination of means defined in claim 10 and said permanent magnet means comprising a permanent magnet having two flat ends, a pair of magnetically permeable pole members held against said flat ends by magnetic force and disposed to slide in any direction parallel to said flat ends in relation thereto for holding said movable means in said inoperative position.

10. In a control device for an automotive vehicle having an engine, said vehicle having brake-actuating means and having engine control means urged toward its idle-speed position, the combination of, movable means including positioning means to establish the operating position of said control means for controlling vehicle-speed independent of foot pressure on the control means by the vehicle-driver, release means operatively connected to said brake actuating means and adapted to cause inactivation of said positioning means with respect to said control means after a predetermined movement of said brake actuating means, restraining means operatively connected to said positioning means to effect a relative movement of said positioning means to an inoperative position completely out of operation with respect to said control means, and permanent magnet means adapted to operatively connect said positioning means to a fixed portion of said vehicle to hold said positioning means in said inoperative position until same is released deliberately by the vehicle-driver.

11. The combination of means defined in claim 10, in which said vehicle includes transmission control means operable into at least neutral and driving positions, and said restraining means comprises means operated by said transmission control means to effect said relative movement of said positioning means to said inoperative position at least in one position of said transmission control means other than said driving position.

12. In a control device for an automotive vehicle having an engine, said vehicle having brake-actuating means and having engine control means urged toward its idle-speed position, the combination of means to hold said control means in any of a plurality of predetermined fixed positions comprising, positioning means for establishing the operating position of said control means including manually adjustable movable means for selectively setting one of said predetermined positions of said control means to establish the desired speed of the vehicle, release means operatively connected to said brake-actuating means and adapted to cause inactivation of said positioning means with respect to said control means after a predetermined movement of said brake-actuating means, said release means including means to cause said inactivation of said positioning means irrespective of a failure of any source of power in any part of the vehicle whenever the device is in operation to position said control means, said holding means including lost-motion means to effect automatic operative engagement of said positioning means and said control means after movement of said control means in its increase-speed direction to a second predetermined position beyond said first predetermined position on the high-speed side thereof in all of said plurality of said positions, said second position being dependent on the setting of said manually adjustable movable means, and said lost-motion means being disposed to enable displacement of said operatively engaged lost-motion means and said control means in its idle-speed direction from said second position to said first predetermined position for holding said control means in said first position.

13. In a control device for an automotive vehicle having an engine, said vehicle having brake-actuating means and having engine control means, and spring means to urge said control means toward its idle-speed position, the combination of means to hold said control means in any of a plurality of predetermined fixed positions comprising; positioning means for establishing the operating position of said control means including manually adjustable movable means for selectively setting one of said predetermined positions of said control means to establish the desired speed of the vehicle, release means operatively connected to said brake-actuating means and adapted to cause the inactivation of said positioning means with respect to said control means after a predetermined movement of said brake-actuating means, said release means including means to cause said inactivation of said positioning means irrespective of a failure of any source of power in any part of the vehicle whenever the device is in operation to position said control means, said holding means including lost motion means providing a detent action to effect automatic operative engagement of said positioning means and said control means after movement of said control means in its increase-speed direction to a second predetermined position beyond said first predetermined position on the high speed side thereof in all of said plurality of said positions, the distance between said first and second positions being independent of the setting of said manually adjustable movable means, and said lost-motion means being disposed to enable said spring means to move said operatively engaged lost-motion means and said control means in its idle-speed direction from said second position to said first predetermined position for holding said control means in said first position.

14. In a control device for an automotive vehicle having an engine, said vehicle having brake-actuating means and having engine control means, and biasing means to urge said control means toward its idle-speed position, the combination of means to hold said control means in any desired predetermined first position comprising, movable means including positioning means for establishing said control means in said first position, release means operatively connected to said brake-actuating means and adapted to cause inactivation of said positioning means with respect to said control means after a predetermined movement of said brake-actuating means, said release means including means to cause said inactivation of said positioning means irrespective of a failure of any source of power in any part of the vehicle whenever the device is in operation to position said control means, said movable means including lost-motion means to effect automatic operative engagement of said positioning means and said control means after movement of said control means in its increase-speed direction to a second predetermined position beyond said first position, said lost-motion means being disposed to enable said biasing means to move said operatively engaged lost-motion means and said engaged control means in its idle-speed direction to said first predetermined position for holding said control means in said first position, and restraining means operatively associated with said positioning means to automatically move and maintain same in relation to said control means in an inoperative status.

15. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined first position comprising, movable means including positioning means for establishing said control means in said first position, release means operatively associated with said brake-actuating means and adapted to cause inactivation of said positioning means without rendering same inoperative with respect to said control means after a predetermined movement of said brake-actuating means, said release means including means to cause said inactivation of said positioning means irrespective of a failure of any source of power in any part of the vehicle whenever the device is in operation to position said control means, said movable means including lost-motion means to effect automatic operative engagement of said positioning means and said control means after movement of said control means in its increase-speed direction to a second predetermined position beyond said first position, said lost-motion means being disposed to enable said biasing means to move said operatively engaged lost-motion means and said engaged control means in its idle-speed direction to said first predetermined position for holding said control means in said first position, and restraining means operatively associated with said positioning means and operable as a result of said movements of said element to automatically render said positioning means inoperative in relation to said control means and to enable said device to be manually activated whenever the vehicle is again being driven.

16. The combination of means defined in claim 15, and in which said restraining means includes electromagnetic means operable as a result of said movements of said element to render said positioning means inoperative.

17. The combination of means defined in claim 15, in which said vehicle element comprises transmission control means movable by said driver into a plurality of positions including a neutral position, and said restraining means comprises means operated by said transmission control means to move said positioning means to said inoperative status at least in said neutral position thereof.

18. In a control device for an automotive vehicle having an engine, said vehicle having brake-actuating means and having engine control means and biasing means to urge said control means toward its idle-speed position, and said vehicle including an element movable selectively by the vehicle-driver incident to normal operation of the vehicle at least after it has been brought to a stop after having been driven, the combination of means to hold said control means in any desired predetermined first position comprising, movable means including positioning means for establishing said control means in said first position, release means operatively associated with said brake-actuating means and adapted to cause inactivation of said positioning means without rendering same inoperative with respect to said control means after a predetermined movement of said brake-actuating means, said release means including means to cause said inactivation of said positioning means irrespective of a failure of any source of power in any part of the vehicle whenever the device is in operation to position said control means, said movable means including lost-motion means to effect automatic operative engagement of said positioning means and said control means after movement of said control means in its increase speed direction to a second predetermined position beyond said first position, and said lost-motion means being disposed to enable said biasing means to move said operatively engaged lost-motion means and said engaged control means in its idle-speed direction to said first predetermined position for holding said control means in said first position, restraining means operatively associated with said positioning means and operable as a result of said movements of said element to automatically render said positioning means inoperative in relation to said control means and to enable said device to be manually activated whenever the vehicle is again being driven, and manually releasable safety means to maintain said positioning means in said inoperative status when said vehicle is again being driven, and to enable the operator to consciously release said safety means from said inoperative status for enabling activation of the control device at least each time the vehicle is first operated.

19. In a control device for an automotive vehicle having an engine, said vehicle having brake-actuating means and having engine control means urged toward its idle-speed position, and said vehicle including an element movable by the vehicle-driver, the combination of means to hold said control means in any of a plurality of predetermined fixed positions comprising, positioning means for establishing the operating position of said control means including manually adjustable movable means for selectively setting one of said predetermined positions of said control means to establish the desired speed of the vehicle, release means operatively connected to said brake-actuating means and adapted to cause inactivation of said positioning means without rendering same inoperative with respect to said control means after a predetermined movement of said brake-actuating means, said release means including means to cause said inactivation of said positioning means irrespective of a failure of any source of power in any part of the vehicle whenever the device is in operative to position said control means, said holding means including lost-motion means to effect automatic operative engagement of said positioning means and said control means after movement of said control means in its increase speed direction to a second predetermined position beyond said first predetermined position on the high speed side thereof in all of said plurality of said positions, the distance between said first position and said second position being independent of the setting of said manually adjustable movable means, said lost-motion means being disposed to enable displacement of said operatively engaged lost-motion means and said control means in its idle-speed direction from said second position to said first predetermined position for holding said control means in said first position, and restraining means operatively associated with said positioning means and operable as a result of said movements of said element to automatically render said positioning means inoperative in relation to said control means.

20. In a control device for an automotive vehicle having an engine, said vehicle having brake-actuating means and having engine control means and spring means to urge said control means toward its idle-speed position and said vehicle including an element movable selectively by the vehicle-driver incident to normal operation of the vehicle at least after it has been brought to a stop after having been driven, the combination of means to hold said control means in any of a plurality of predetermined fixed positions comprising, positioning means for establishing the operating position of said control means including manually adjustable movable means for selectively setting one of said predetermined positions of said control means to establish the desired speed of the vehicle, release means operatively associated with said brake actuating means to cause inactivation of said positioning means without rendering same inoperative with respect to said control means after a predetermined movement of said brake actuating means, said release means including means to cause said inactivation of said positioning means irrespective of a failure of any source of power in any part of the vehicle whenever the device is in operation to position said control means, said holding means including lost-motion means to effect automatic operative engagement of said positioning means and said control means after movement of said control means in its increase-speed direction to a second predetermined position beyond said first predetermined position on the high-speed side thereof in all of said plurality of said positions, the distance between said first and second positions being independent of the setting of said manually adjustable movable means, said lost-motion means being disposed to enable said spring means to move said operatively engaged lost-motion means and said control means in its idle-speed direction from said second position to said first predetermined position for holding said control means in said first position, restraining means operatively associated with said positioning means and operable as a result of movements of said element to automatically render said positioning means inoperative in relation to said control means and to enable said device to be manually activated whenever the vehicle is again being driven, and manually releasable safety means to maintain said positioning means in said inoperative status when said vehicle is again being driven, and to enable the operator to consciously release said safety means from said inoperative status for enabling activation of the control device at least each time the vehicle is first operated.

21. In a control device for an automotive vehicle having an engine, said vehicle having brake-actuating means and having engine control means, and biasing means to urge said control means toward its idle-speed position, the combination of means to hold said control means in any desired predetermined first position comprising, movable means including positioning means for establishing said control means in said first position, said movable means including a tube member, said member including a shaft disposed within said tube and rotatable in relation to said tube member to effect in relation thereto axial movements of said positioning means upon rotation of said shaft, said positioning means carrying a lost-motion member axially slidable in relation thereto and having a lost-motion connection therebetween from said first axial position to a second axial position on the high-speed side of said first position, the distance between said two axial positions being independent of the rotary position of said shaft, said lost-motion member being disposed to engage said control means, release means operatively associated with said brake-actuating means and adapted to cause inactivation of said positioning means with respect to said control means after a predetermined movement of said brake-actuating means, said movable means being adapted to effect automatic operative engagement of said positioning means and its said lost-motion member with said control means after movement of said control means in its increase-speed direction to said second predetermined position beyond said first position, said biasing means thereupon moving said lost-motion member and engaged control means in its idle-speed direction from said second position to said first position for holding said control means in said first position.

22. In a control device for an automotive vehicle having an engine, said vehicle having brake-actuating means and having engine control means, and biasing means to urge said control means toward its idle-speed position, the combination of means to hold said control means in any desired predetermined first position comprising, movable means including positioning means for establishing said control means in said first position, said movable means including a tube member, said positioning means including a shaft disposed within said tube member and rotatable in relation to said tube member to effect in relation thereto axial movements of said positioning means upon rotation of said shaft, said positioning means carrying a lost-motion member axially slidable in relation thereto and having a lost-motion connection therebetween from said first axial position to a second axial position on the high-speed side of said first position, said lost-motion member being disposed to engage said control means, release means operatively connected to said brake-actuating means and adapted to cause inactivation of said positioning means with respect to said control means after a predetermined movement of said brake-actuating means, said movable means also including mounting means operatively connected to a fixed part of the vehicle to enable said tube member with said positioning means and its said lost-motion member to move in a direction transverse to the direction of movement of said control means at said contact with said lost-motion member upon said predetermined inactivating movement of said brake-actuating means, said movable means being adapted to effect automatic operative engagement of said positioning means and its said lost-motion member with said control means after movement of said control means in its increase-speed direction to said second predetermined position beyond said first position, said biasing means thereupon moving said lost-motion member and engaged control means in its idle-speed direction from said second position to said first position for holding said control means in said first position.

23. The combination of elements defined in claim 22, in which said mounting means includes hinge means to cause said positioning means and its said lost-motion member to move in a vertical arcuate path in said transverse direction.

24. In a control device for an automotive vehicle having an engine, said vehicle having brake-actuating means and having engine control means urged toward its idle-speed position, and said vehicle including an element movable selectively by the vehicle-driver incident to normal operation of the vehicle at least after it has been brought to a stop after having been driven, the combination comprising, movable means operatively connected to a supporting portion of said vehicle and including positioning means for setting said control means in its desired operating position, said movable means including means to effect automatic operative engagement of said positioning means and said control means after movement thereof in its increase-speed direction, release means operatively connected to said brake-actuating means and adapted to cause inactivation of said positioning means with respect to said control means after a predetermined movement of said brake-actuating means, said release means including means responsive to movements of said brake-actuating means for causing said inactivation of said positioning means irrespective of a failure of any source of power in any part of the vehicle whenever the device is in operation to position said control means, restraining means operatively connected to said positioning means and operable as a result of said movements of said element to automatically render said positioning means inoperative with respect to said control means, and safety means operatively associated with said positioning means for maintaining same in said inoperative status after said vehicle is again placed in operation until said positioning means is deliberately and consciously activated manually by the vehicle-driver.

25. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined first position comprising, movable means including positioning means for establishing said control means in said first position, release means operatively associated with said brake-actuating means and adapted to cause inactivation of said positioning means without rendering same inoperative with respect to said control means after a predetermined movement of said brake-actuating means, said movable means including lost-motion means to effect automatic operative engagement of said positioning means and said control means after movement of said control means in its increase-speed direction to a second predetermined position beyond said first position, said lost-motion means being disposed to enable said biasing means to move said operatively engaged lost-motion means and said engaged control means in its idle-speed direction to said first predetermined position for holding said control means in said first position, and restraining means operatively associated with said positioning means and operable as a result of said movements of said element to automatically render said positioning means inoperative in relation to said control means and to enable said device to be manually activated whenever the vehicle is again being driven, said restraining means being completely separate from and operable independently of said release means in rendering said positioning means inoperative or inactive, respectively.

26. The combination of means defined in claim 24, and said vehicle including a compartment occupied by the vehicle-driver, and said brake-actuating means including a brake pedal member mounted in said driver's compartment, and said control means including accelerator pedal means also mounted in said compartment, and means to mount said device in said compartment to a fixed portion of said vehicle to enable said positioning means to hold said accelerator pedal means in any desired position, and said release means comprising completely mechanical means operatively connected to said positioning means to positively force movement thereof completely clear of the normal path of travel of said control means as a result of said movement of said brake-actuating means by said driver.

27. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined position comprising, movable means including positioning means for establishing said control means in said predetermined position, release means operatively associated with said brake-actuating means and adapted to cause inactivation of said positioning means without rendering same inoperative with respect to said control means after a predetermined movement of said brake-actuating means, said movable means including means to effect automatic operative engagement of said positioning means with said control means after movement of said control means in its increase-speed direction to said predetermined position, restraining means operatively associated with said positioning means and operable as a result of said movements of said element to automatically render said positioning means inoperative in relation to said control means and to enable said device to be manually activated whenever the vehicle is again being driven, and manually releasable safety means separate from said restraining means but adapted to be initiated automatically as a result of said operation of said restraining means upon said movement of said element to maintain said positioning means in said inoperative status in relation to said control means independently of subsequent reverse operation of said restraining means, until said safety means is deliberately and consciously released manually by the vehicle-driver.

28. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined first position comprising, movable means including positioning means for establishing said control means in said first position, release means operatively associated with said brake-actuating means and adapted to cause inactivation of said positioning means without rendering same inoperative with respect to said control means after a predetermined movement of said brake-actuating means, said movable means including lost-motion means to effect automatic operative engagement of said positioning means and said control means after movement of said control means in its increase-speed direction to a second predetermined position beyond said first position, said lost-motion means being disposed to enable said biasing means to move said operatively engaged lost-motion means and said engaged control means in its idle-speed direction to said first predetermined position for holding said control means in said first position, restraining means operatively associated with said positioning means and operable as a result of said movements of said element to automatically render said positioning means inoperative in relation to said control means and to enable said device to be manually activated whenever the vehicle is again being driven, said restraining means being completely separate from and operable independently of said release means in rendering said positioning means inoperative or inactive, respectively, and safety means adapted to be initiated automatically as a result of said operation of said restraining means upon said movement of said element to maintain said positioning means in said inoperative status in relation to said control means independently of subsequent reverse operation of said restraining means, said safety means including manually operated means to enable the vehicle driver to deliberately and consciously release said positioning means from said inoperative status.

29. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined position comprising, movable means including positioning means for establishing said control means in said predetermined position, release means operatively associated with said brake-actuating means and adapted to cause inactivation of said positioning means without rendering same inoperative with respect to said control means after a predetermined movement of said brake-actuating means, said movable means including means to effect automatic operative engagement of said positioning means and said control means after movement of said control means in its increase-speed direction to said predetermined position, restraining means operatively associated with said positioning means and operable as a result of said movements of said element to automatically render said positioning means inoperative in relation to said control means, said restraining means being separate from and operable independently of said release means in rendering said positioning means inoperative or inactive, respectively, and manually releasable safety means operatively associated with said restraining means to maintain said positioning means in said inoperative status until said safety means is deliberately and consciously released by the vehicle-driver.

30. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined position comprising, movable means including positioning means for establishing said control means in said predetermined position, release means operatively associated with said brake-actuating means and adapted to cause inactivation of said positioning means without rendering same inoperative with respect to said control means after a predetermined movement of said brake-actuating means, said movable means including means to effect automatic operative engagement of said positioning means and said control means after movement of said control means in its increase-speed direction to said predetermined position, restraining means operatively associated with said positioning means and operable as a result of said movements of said element to automatically render said positioning means inoperative in relation to said control means, safety means adapted to be initiated automatically as a result of said operation of said restraining means upon said movement of said element to maintain said positioning means in said inoperative status in relation to said control means irrespective of subsequent reverse operation of said restraining means, and manually controlled means operatively associated with said safety means to enable the vehicle-driver to deliberately and consciously release said positioning means from said inoperative status.

31. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined position comprising, movable means including positioning means for establishing said control means in said predetermined position, mechanical release means operatively connected to said positioning means and actuated directly by said brake-actuating means to positively force inactivation of said positioning means without rendering same inoperative with respect to said control means after a predetermined movement of said brake-actuating means, said movable means including means to effect automatic operative engagement of said positioning means and said control means after movement of said control means in its increase-speed direction to said predetermined position, restraining means operatively associated with said positioning means and operable as a result of said movements of said element to automatically render said positioning means inoperative in relation to said control means.

32. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined position comprising, movable means including positioning means for establishing said control means in said predetermined position, mechanical release means operatively connected to said positioning means and actuated directly by said brake-actuating means to positively force inactivation of said positioning means without rendering same inoperative with respect to said control means after a predetermined movement of said brake-actuating means, said movable means including means to effect automatic operative engagement of said positioning means and said control means after movement of said control means in its increase-speed direction to said predetermined position, restraining means operatively associated with said positioning means and operable as a result of said movements of said element to automatically render said positioning means inoperative in relation to said control means, said restraining means being separate from and operable independently of said release means in rendering said positioning means inoperative or inactive, respectively, and manually releasable safety means operatively associated with said restraining means to maintain said positioning means in said inoperative status until said safety means is deliberately and consciously released by the vehicle-driver.

33. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined position comprising, movable means including positioning means for establishing said control means in said predetermined position, release means operatively associated with said brake-actuating means and adapted to cause inactivation of said positioning means without rendering same inoperative with respect to said control means after a predetermined movement of said brake-actuating means, said movable means including means to effect automatic operative engagement of said positioning means and said control means after movement of said control means in its increase-speed direction to said predetermined position, restraining means operatively associated with said positioning means and operable as a result of said movements of said element to automatically render said positioning means inoperative in relation to said control means, said restraining means being separate from and operable independently of said release means in rendering said positioning means inoperative or inactive, respectively, and safety means adapted to be initiated automatically as a result of said operation of said restraining means upon said movement of said element to maintain said positioning means in said inoperative status in relation to said control means irrespective of subsequent reverse operation of said restraining means, said safety means including manually operated means to enable the vehicle-driver to deliberately and consciously release said positioning means from said inoperative status.

34. In a control device for an automotive vehicle having an engine, said vehicle having brake-actuating means and having engine control means and biasing means to urge said control means toward its idle-speed position, said vehicle also including an element movable selectively by the vehicle-driver incident to normal operation of the vehicle at least after it has been brought to a stop after having been driven, the combination of means to hold said control means in any desired predetermined position comprising, movable means including positioning means for establishing said control means in said predetermined position, release means operatively associated with said brake-actuating means and adapted to cause inactivation of said positioning means without rendering same inoperative with respect to said control means after a predetermined movement of said brake-actuating means, said movable means including means to effect automatic operative engagement of said positioning means and said control means after movement of said control means in its increase-speed direction to said predetermined position, restraining means operatively associated with said positioning means and including electro-magnetic means operable as a result of said movements of said element to automatically render said positioning means inoperative in relation to said control means, and manually releasable safety means operatively associated with said restraining means and including latch means to maintain said positioning means in said inoperative status until said safety means is deliberately and consciously released by the vehicle-driver.

References Cited by the Examiner
UNITED STATES PATENTS

| | | | |
|---|---|---|---|
| 2,167,843 | 8/39 | Johnson | 74—482 |
| 2,490,473 | 12/49 | Rodkey. | |
| 2,609,074 | 9/52 | Leihgeber. | |
| 2,742,123 | 4/56 | Exline. | |
| 3,000,475 | 9/61 | Arpin | 74—482 |

DAVID J. WILLIAMOWSKY, *Primary Examiner.*